Feb. 3, 1948.                    D. M. STAINBROOK                    2,435,329
                                    PIPE WRENCH
                                 Filed Dec. 9, 1944
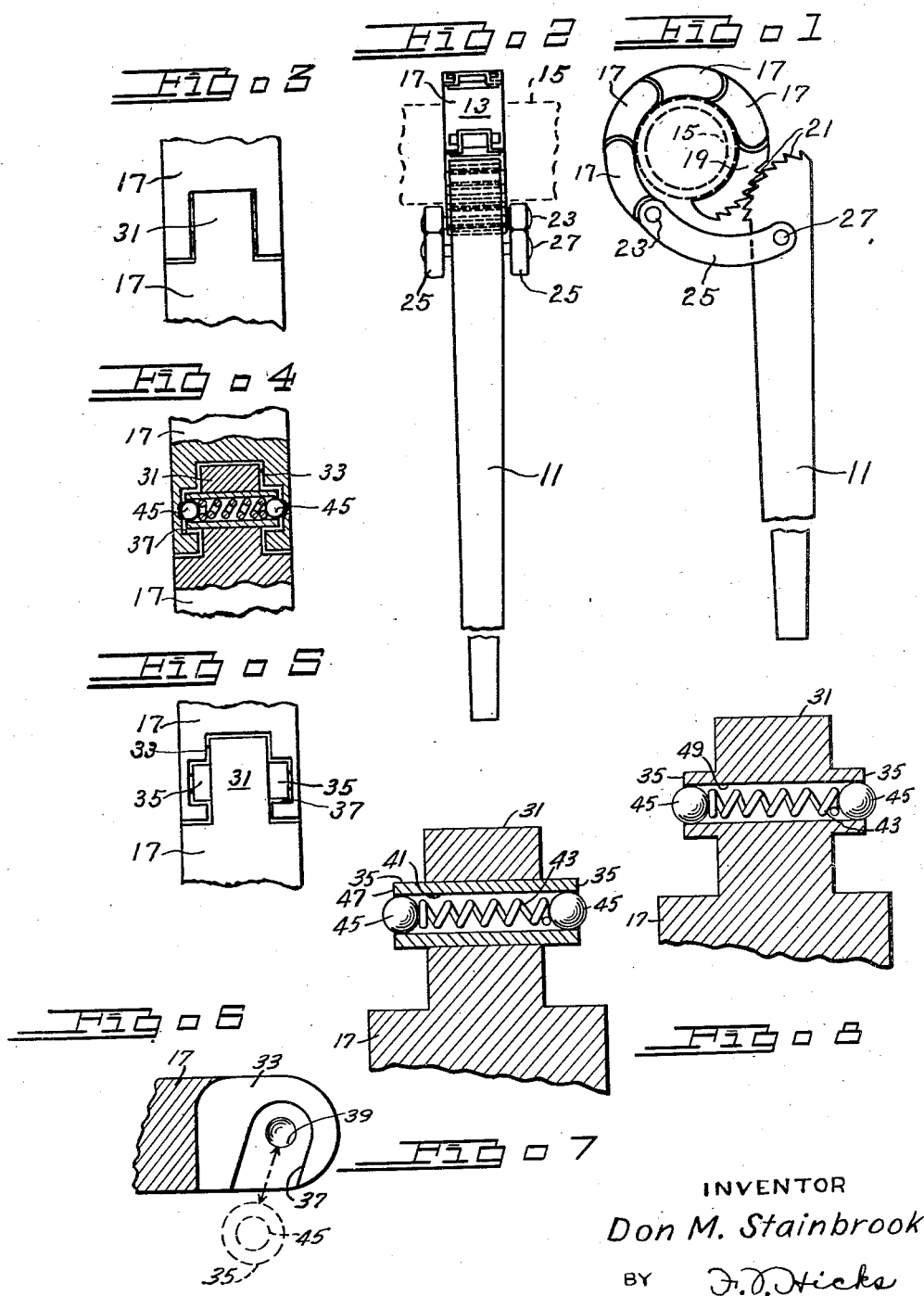
INVENTOR
Don M. Stainbrook
BY   F. D. Hicks
       ATTORNEY Patented Feb. 3, 1948

2,435,329

UNITED STATES PATENT OFFICE 2,435,329

PIPE WRENCH

Don M. Stainbrook, Detroit, Mich.

Application December 9, 1944, Serial No. 567,400

3 Claims. (Cl. 287—96)

My invention pertains to wrenches and more particularly to wrenches for gripping and turning members of cylindrical conformation, more commonly known as pipe wrenches.

It is an object of my invention to provide an improved wrench for gripping and turning cylindrical objects, such as pipes, without crushing or deforming such objects, or marring the finish of the outer surfaces.

It is also an object of my invention to provide an improved jointed semi-flexible gripping member for pipe wrenches or other applications.

It is a further object of my invention to provide an improved section element for a jointed semi-flexible gripping member.

Further objects and advantages are within the scope of the invention, such as relate to the arrangement, operation and function of the related elements of the structure, to various details of construction and to combinations of parts, elements, per se, and to economies of manufacture and numerous other features as will be apparent from a consideration of the specification in conjunction with the drawings disclosing specific embodiments of the invention, in which:

Fig. 1 is a side elevational view showing a pipe wrench constructed in accordance with my invention and arranged in gripping relation on a pipe which is represented by dotted lines;

Fig. 2 is an edge elevational view;

Fig. 3 is an enlarged fragmentary elevational view showing the inner side of a pivotal joint between adjacent sections of the jointed semi-flexible gripping members;

Fig. 4 is a similar view partially broken away and sectioned to show the internal construction;

Fig. 5 is an enlarged elevational view showing the outer side of the joint;

Fig. 6 is an enlarged fragmentary inner view showing one side of a central slot with its retainer slot and representing an insertable hub of an adjacent section in dotted lines;

Fig. 7 is an enlarged view of a tongue with hubs, partially broken away and sectioned, showing the internal construction of the hubs; and Fig. 8 is a similar view showing another embodiment.

Referring more specifically to Fig. 1, my improved wrench comprises a handle lever 11 suitably arranged to apply manual effort for wrapping a jointed or semi-flexible gripping member 13 about a cylindrical member such as a pipe 15, represented in dotted lines, which is to be gripped snugly and firmly for turning the pipe without deforming or crushing same.

In accordance with my invention, the jointed gripping member 13 comprises a plurality of sections 17 which are pivotally connected together, in a manner to be subsequently described in detail. Each of these sections is provided with an inner surface of a concave curvature for smoothly engaging and gripping on the surface of the pipe. If desired, any suitable liner of yieldable material (not shown) may be mounted upon the inner surfaces of these sections, in accordance with well known arrangements. At one end of the jointed gripping member an end section 19 is pivotally connected which likewise preferably has a concave inner surface. The outer surface of this end section 19 and the adjacent end of the lever handle 11 are provided with mutually interengageable surfaces, such as the rack teeth 21 represented in Fig. 1, whereby these parts may be operatively engaged in a manner suitable for gripping the flexible member 13 snugly around a cylindrical member of any size, within a certain range. To draw the joined gripping member around the pipe, the other end of the jointed member is pivotally secured, as by a pivot pin 23, to the ends of a pair of links 25, the other ends of said links being pivotally connected to said handle lever 11 at a point spaced suitably from the toothed end, as by a pivot pin 27 passing therethrough, as shown in Figs. 1 and 2. The links 25 are curved for encircling a pipe to the fullest extent possible, as when turning pipe of a small size.

In accordance with my invention, I provide an improved interlocking joint between the adjacent ends of the respective sections of the jointed gripping member whereby these may be conveniently and quickly coupled together in a smooth symmetrical conformation and wherein additional sections may be conveniently inserted or substituted for lengthening or for repairing the jointed gripping member.

As shown in Figs. 3 through 7, the improved joint provided between the ends of the jointed gripping sections 17 comprises a tongue 31 projecting centrally from one end of each section body 17, and each other end of each section body is provided with a slot 33 opening centrally therein of a slightly greater width suitably for receiving the tongue from the next adjacent section. Each tongue is provided with a pair of hubs 35 projecting laterally therefrom in opposite directions. The opposite sidewalls of each central slot 33 are each provided with a retainer slot 37, one of which is more clearly shown in Fig. 6, suitable for receiving the hubs, oppositely directed from the tongue, and which are hooked thereinto in interlocking relation, as represented by dotted lines and arrow in Fig. 6, as the sections are connected together.

In order to hold the sections hooked together in interlocked relation, each retainer slot 37 is provided with a retainer depression 39, and each hub is provided with a recess 41 wherein is inserted a spring 43 and a retainer 45, which may be a ball, which springs snugly into the depression. After the retainers 45, balls or other forms, are inserted into the hub recesses, the other ends of these recesses are deformed, as by peening, to provide sufficiently inwardly deformed metal to hold the respective retainers in their recesses with only a portion of each protruding sufficiently to seat snugly into the respective retainer depressions 39, as in Figs. 7 and 8.

Fig. 7 shows how the tongue 31 is provided with oppositely directed hubs which consist of the ends of a tube 47 which is passed through the tongue. The tongue is provided with an aperture through which the tube may be snugly pressed and the tube is of a length to provide hubs projecting suitably on opposite sides of the tongue. The bore of the tube provides a recess for receiving the spring 43 and a pair of retainers 45 or balls for holding the hubs in the slots in the next adjacent section body. Fig. 8 shows a different embodiment in which the hubs 35 are formed integral with the section. An aperture 49 passes therethrough for operatively receiving retainer balls 45 and a spring 43 for pressing the balls outwardly, as described with reference to the first embodiment. In both embodiments the section bodies are preferably drop forgings.

It is apparent that within the scope of my invention modifications and different arrangements may be made other than herein disclosed, and the present disclosure is illustrative merely, the invention comprehending variations thereof.

What I claim is:

1. A sectional element for a pivotally joined member comprising, a section body, a tongue projecting centrally from one end of said body, a pair of hubs projecting laterally from opposite sides of said tongue, an aperture extending axially into each hub, a retainer in each hub, spring means tending to urge the retainer outwardly, means holding the retainer in the hubs with portions of the retainers protruding therefrom, said section having a slot opening centrally into the other end of a width slightly greater than the width of said tongue, a pair of retainer slots opening laterally and cooperatively in opposing relations in the opposite sidewalls of said central slot, said retainer slots opening out through one side of said section for receiving the hubs from the tongue of an adjacent section to be coupled therewith, and retainer depressions in the retainer slots for receiving the spring pressed retainer from a section to be coupled therewith.

2. A flexible member comprising, a plurality of relatively movable sections, interlocking means self-contained within said sections for pivotally connecting said sections together, each of said sections and interlocking means comprising, a section body, a tongue projecting centrally from one end of said body, a pair of hubs projecting laterally from opposite sides of said tongue, an aperture extending axially into each hub, a retainer in each hub, spring means tending to urge the retainers outwardly, means holding the retainers in the hubs with portions of the retainers protruding therefrom, said section having a slot opening centrally into the other end and of a width slightly greater than the width of said tongue, a pair of retainer slots opening laterally and cooperatively in opposing relations in the opposite sidewalls of said central slots, said retainer slots opening out through one side of said section for receiving the hubs from the tongue of an adjacent section to be coupled therewith, and retainer depressions in the retainer slots for receiving the spring pressed retainers from a section to be coupled therewith.

3. A sectional element for a pivotally jointed member in accordance with claim 1 and further characterized by having a single aperture extending through and between the hubs, the retainer in each hub being a ball, and a single spring in said aperture reacting between the two balls to press these outwardly.

DON M. STAINBROOK.

REFERENCES CITED

The following references are of record in the file of this patent:

UNITED STATES PATENTS

| Number | Name | Date |
|---|---|---|
| 420,938 | Hamlin | Feb. 11, 1890 |
| 541,166 | Hunter | June 18, 1895 |
| 581,509 | Dietz | Apr. 27, 1897 |
| 717,098 | Jester | Dec. 30, 1902 |
| 769,043 | Amborn | Aug. 30, 1904 |
| 915,524 | Wise | Mar. 16, 1909 |
| 1,321,151 | Rawley | Nov. 11, 1919 |
| 1,321,356 | Bateman | Nov. 11, 1919 |
| 1,413,306 | Weston | Apr. 18, 1922 |
| 1,576,258 | Trabold | Mar. 9, 1926 |
| 1,630,822 | Bessolo | May 31, 1927 |
| 1,643,825 | Rewett | Sept. 27, 1927 |
| 1,775,620 | Greenburg | Sept. 9, 1930 |
| 1,796,775 | Warren | Mar. 17, 1931 |
| 2,342,396 | Goddard | Feb. 22, 1944 |
| 2,352,347 | Scrantom | June 27, 1944 |

FOREIGN PATENTS

| Number | Country | Date |
|---|---|---|
| 73,144 | Germany | Jan. 19, 1894 |